(12) United States Patent
Ishimi

(10) Patent No.: US 6,771,100 B2
(45) Date of Patent: Aug. 3, 2004

(54) CLOCK CONTROL CIRCUIT

(75) Inventor: Kouichi Ishimi, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 10/166,267

(22) Filed: Jun. 11, 2002

(65) Prior Publication Data

US 2003/0006813 A1 Jan. 9, 2003

(30) Foreign Application Priority Data

Jun. 29, 2001 (JP) ........................................ 2001-199430

(51) Int. Cl.$^7$ ............................................... H03L 7/00
(52) U.S. Cl. ........................ 327/142; 327/160; 327/114
(58) Field of Search ............................... 327/141, 142, 327/144, 151, 160, 161, 113, 114, 291, 298

(56) References Cited

U.S. PATENT DOCUMENTS

| | | | |
|---|---|---|---|
| 5,524,035 A | * 6/1996 | Casal et al. | 377/47 |
| 5,721,740 A | 2/1998 | Moon et al. | |
| 6,225,840 B1 | 5/2001 | Ishimi | 327/116 |
| 6,292,412 B1 | * 9/2001 | Kato et al. | 365/194 |
| 6,326,823 B1 | * 12/2001 | Okui | 327/160 |

FOREIGN PATENT DOCUMENTS

| | | |
|---|---|---|
| DE | 37 06 089 C2 | 9/1987 |
| DE | 690 29 577 T2 | 1/1992 |
| DE | 196 02 517 A1 | 8/1996 |
| DE | 196 25 185 C2 | 1/1997 |
| DE | 100 15 187 A1 | 2/2001 |
| JP | 54-146926 | 11/1979 |
| JP | 57-34245 | 2/1982 |
| JP | 4-12842 | 3/1992 |
| JP | 5-313779 | 11/1993 |
| JP | 2000-77991 | 3/2000 |
| TW | 421885 | 2/2001 |

OTHER PUBLICATIONS

Related U.S. Application Ser. No. 09/476,127, filed Jan. 3, 2000.

Related U.S. Application Ser. No. 09/670,584, filed Sep. 27, 2000.

* cited by examiner

Primary Examiner—Timothy P. Callahan
Assistant Examiner—Cassandra Cox
(74) Attorney, Agent, or Firm—McDermott, Will & Emery

(57) ABSTRACT

A clock signal is supplied from a clock oscillator to a gate circuit. In a period in which a reset signal is at the "H" level, the clock signal is supplied to an internal circuit. When the reset signal becomes at the "L" level, a control is performed by a gate control circuit so as to stop the supply of the clock signal. Consequently, even when a delay signal in the internal circuit becomes longer than one cycle of the clock signal, occurrence of an erroneous operation can be prevented.

20 Claims, 23 Drawing Sheets

FIG.21 A CLOCK
FIG.21 B RESET
FIG.21 C R1
FIG.21 D R5

PRIOR ART

VARIATION IN DELAY

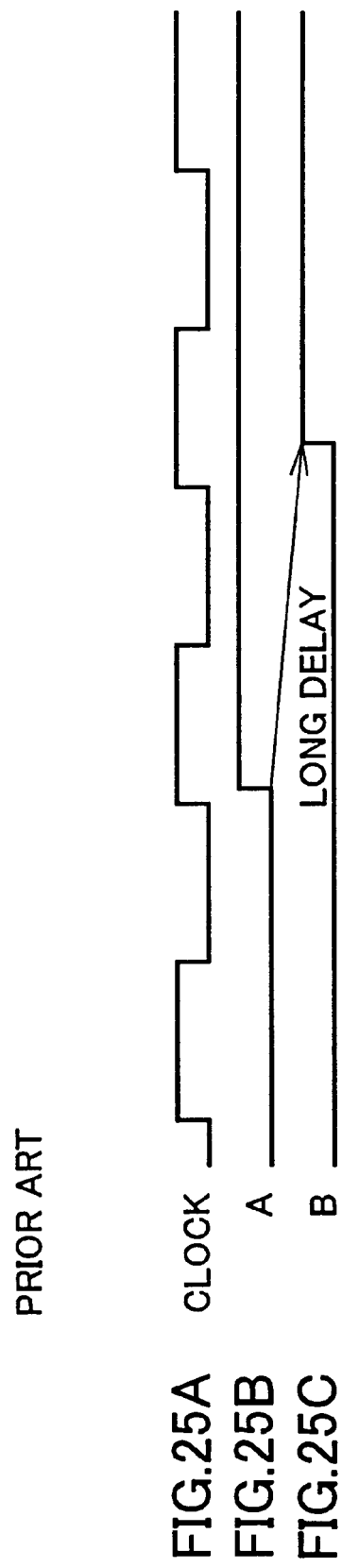

CLOCK CONTROL CIRCUIT

BACKGROUND OF THE INVENTION

1. Field of the Invention

The present invention relates to a clock control circuit. More particularly, the invention relates to a clock control circuit capable of achieving desired performance while suppressing power consumption and increase in circuit scale even if there is a signal of a heavy load or a signal having long delay time such as a reset signal.

2. Description of the Background Art

Since a reset signal sets a number of latches at a time, the fan-out is very large. Consequently, it takes time that the reset signal propagates through latches from a reset circuit. Particularly, when the operation frequency is high, it takes time to receive a reset release signal from the outside and release all of latches from the reset state. It becomes a cause of an erroneous operation.

For example, in the case of a circuit shown in FIG. 20, a reset signal shown in FIG. 21B is supplied to reset terminals (R1 to R5) of D-type flip flops 21 to 25 via a buffer 20. Since the output of buffer 20 is a load of five D-type flip flops 21 to 25, there is the possibility that propagation time of reset signal R1 of D-type flip flop 21 shown in FIG. 21C and propagation time of reset signal R5 of D-type flip flop 25 shown in FIG. 21D are deviated from each other by one cycle of a clock signal shown in FIG. 21A. In this case, a reset releasing timing of D-type flip flop 21 to be reset by reset signal R1 and that of D-type flip flop 25 to be reset by reset signal R5 are deviated from each other by a clock cycle, and it becomes a cause of an erroneous operation.

Although the maximum frequency of a system is determined by a slowest path, pulse delay of releasing a reset state decreases the operation frequency of an LSI, and the performance of the whole deteriorates.

Methods for solving the problem include a method of connecting buffers 31 to 34 to the output of a buffer 30 in a tree structure as shown in FIG. 22 and a method of propagating a reset signal by a buffer 40 of a large output as shown in FIG. 23. However, the methods have a disadvantage of a large circuit scale and high power consumption.

Other than the reset signal, a similar problem may occur in a signal source having long delay time from which signals are supplied to many blocks.

For example, as shown in FIG. 24, in the case of a path extending from A to B including a node of large fan-out such that a number buffers 41 to 46 are connected to the output of buffer 40, when a delay time from the timing of the rising edge of a signal A shown in FIG. 25B to the timing of the rising edge of a signal B shown in FIG. 25C becomes longer than a clock cycle shown in FIG. 25A, an erroneous operation is caused.

Methods for solving the problems include a method of forming a tree structure and a method of propagating a reset signal by a buffer of a large output in a manner similar to the case of the reset signal. However, the methods have similarly a disadvantage of a large circuit scale and high power consumption.

SUMMARY OF THE INVENTION

An object of the present invention is therefore to provide a clock control circuit which solves the problems by decreasing the frequency of a clock signal or stopping the clock signal after or for a period in which a state of a signal having a long delay time such as a reset signal changes.

The invention relates to, briefly, a technique of stopping supply of a clock signal by a gate circuit in response to a first signal and, when the first signal changes from a first state to a second state, stopping the supply of the clock signal always only for a predetermined period by a gate control circuit.

According to the invention, therefore, after elapse of sufficient time since the first signal has propagated, the clock signal is re-supplied from the output of the gate circuit, so that no erroneous operation occurs. As a result, it is unnecessary to use a buffer of a large output or employ a tree structure for a node having long delay time, and a small circuit of low power consumption can be realized.

Further, according to another aspect of the invention, supply of a clock signal is stopped by a gate circuit in response to a first signal, a second signal of which logic level changes is generated by a gate control circuit in response to the first signal, and the supply of the clock signal is stopped for a period in which the logic level of the second signal changes.

According to further another aspect of the invention, the frequency of a clock signal is decreased by a clock converting circuit in response to a first signal and, when the first signal changes from a first state to a second state, the frequency of the clock signal is decreased always only for a predetermined period by a clock switching circuit.

Further, according to another aspect of the invention, in response to a first signal, a clock signal of which frequency is decreased by a clock converting circuit is output from the clock converting circuit. A second signal of which logic level changes in response to the first signal is generated by a clock switching circuit. The frequency of the clock signal is decreased for a period in which the logic level of the second signal changes.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 25A to 25C are timing charts of the circuit of FIG. 24.

DESCRIPTION OF THE PREFERRED EMBODIMENTS

First Embodiment

Figure 1:
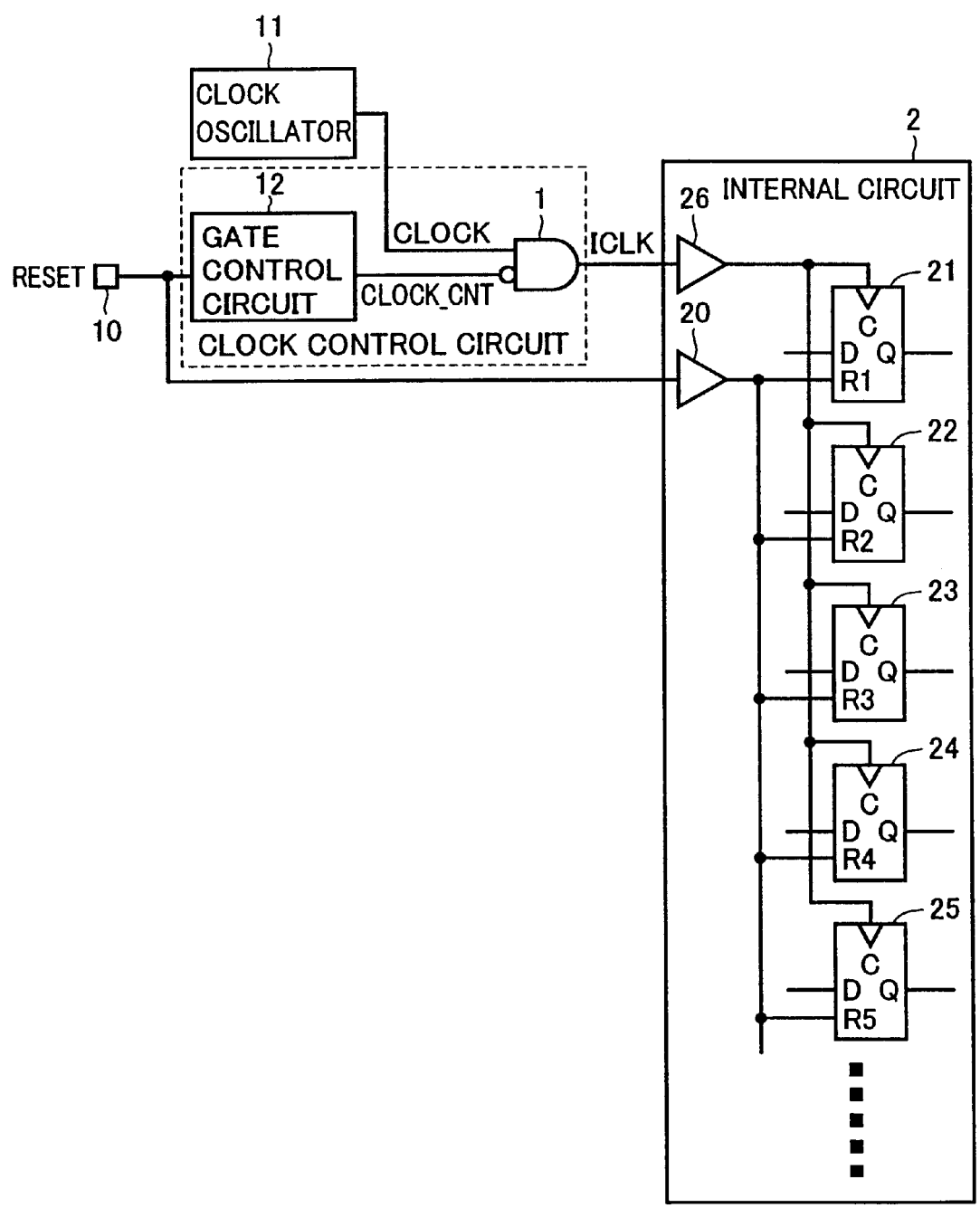
FIG. 1 is a block diagram showing a clock control circuit of a first embodiment of the invention.

FIG. 1 is a block diagram showing a clock control circuit according to a first embodiment of the invention.

In FIG. 1, the clock control circuit of the embodiment is constructed by a gate circuit 1 having two input terminals and a gate control circuit 12. A clock oscillator 11 generates a clock signal ("CLOCK" in the drawings) and supplied it to one of the input terminals of the gate circuit 1. A reset signal is input to an external terminal 10. The reset signal is supplied to both gate control circuit 12 and an internal circuit 2. Gate control circuit 12 outputs a clock control signal ("CLOCK_CNT" in the. drawing) and supplies an inversion signal of the clock control signal to the other input terminal of gate circuit 1 in response to the reset signal. Gate circuit 1 is an AND logic gate for calculating the AND of the clock signal and the inversion signal of the clock control signal, and an internal clock signal ("ICLK" in the drawing) as an output of gate circuit 1 is supplied to internal circuit 2.

Figure 20:
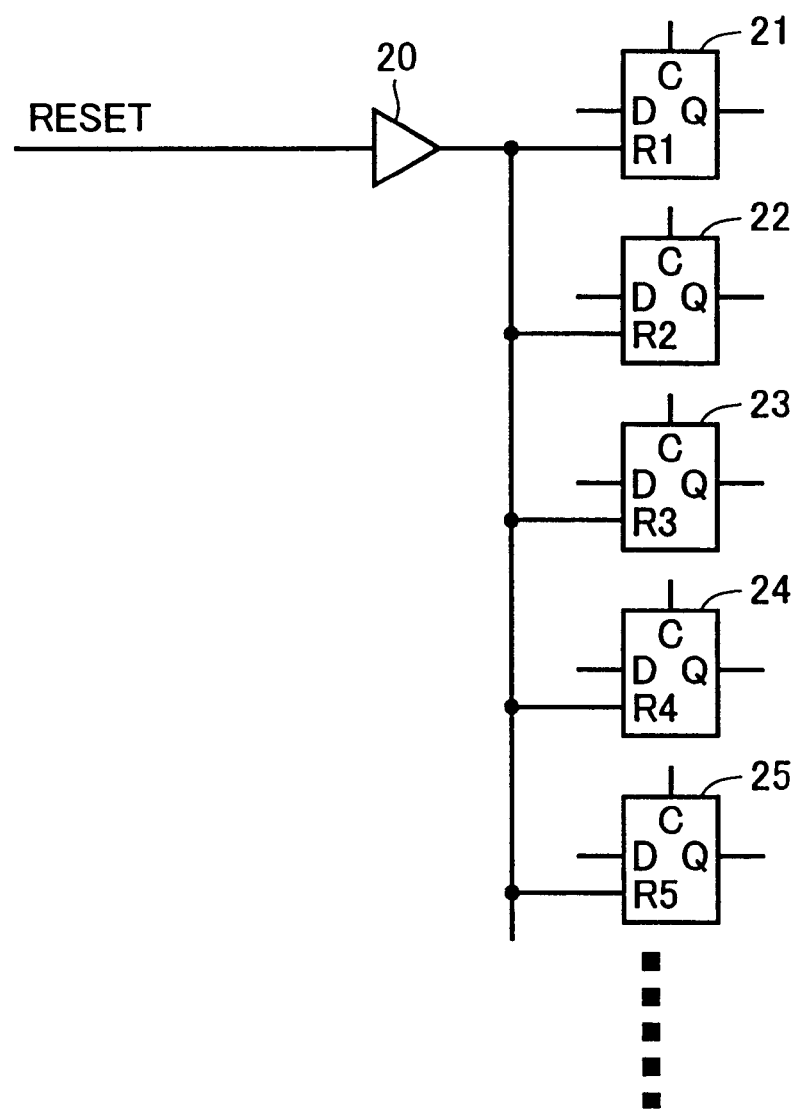
FIG. 20 is a circuit diagram showing a conventional clock control circuit in which five D-type flip flops are connected to a buffer.
Figure 21:
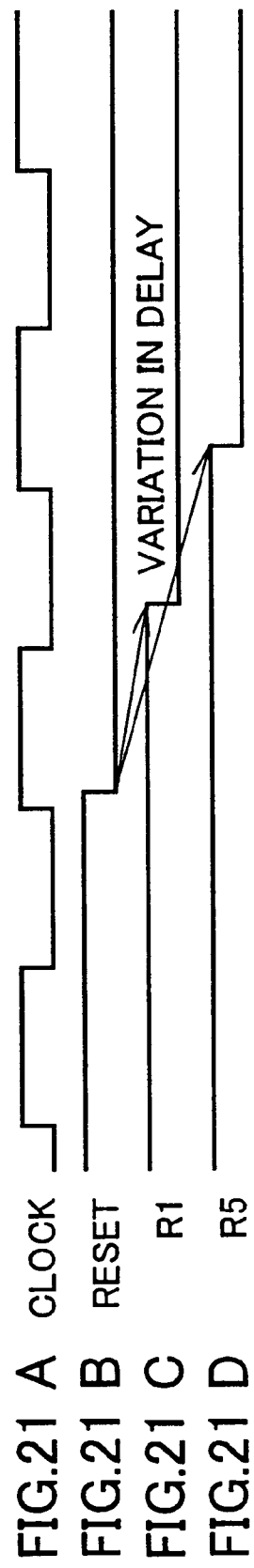
FIGS. 21A to 21D are timing charts of the conventional clock control circuit shown in FIG. 20.

Internal circuit 2 is a circuit for realizing main functions of an integrated circuit formed on the semiconductor chip and is constructed in a manner similar to FIG. 20. Internal circuit 2 includes buffer circuit 20, plurality of D-type flip flops 21 to 25 and, further, a buffer circuit 26 for receiving the internal clock signal output from gate circuit 1. The reset signal is supplied commonly to reset terminals of D-type flip flops 21 to 25 via buffer circuit 20 to reset stored data. The internal clock signal is supplied commonly to clock terminals of D-type flip flops 21 to 25 via buffer circuit 20 to store data supplied to D terminals synchronously with the rising (or falling) edge of internal clock signal ICLK.

In response to the reset signal, gate control circuit 12 stops supply of the clock signal by gate circuit 1, particularly, immediately after the level of the reset signal changes. Gate control circuit 12 stops the supply of the clock signal only for the same period each time the reset signal changes, particularly, from the "H" level to the "L" level and does not stop the supply of the clock signal when the reset signal changes from the "L" level to the "H" level. A first example of the concrete configuration is a circuit of FIG. 3 and a second example is a circuit of FIG. 4.

Clock oscillator 11, gate control circuit 12, gate circuit 1, and internal circuit 2 shown in FIG. 1 are formed on a common semiconductor chip. It is also possible that clock oscillator 11 is not provided on the chip and the clock signal is supplied from the outside of the chip.

FIGS. 2A to 2E are timing charts of the clock control circuit illustrated in FIG. 1.

Figure 2:
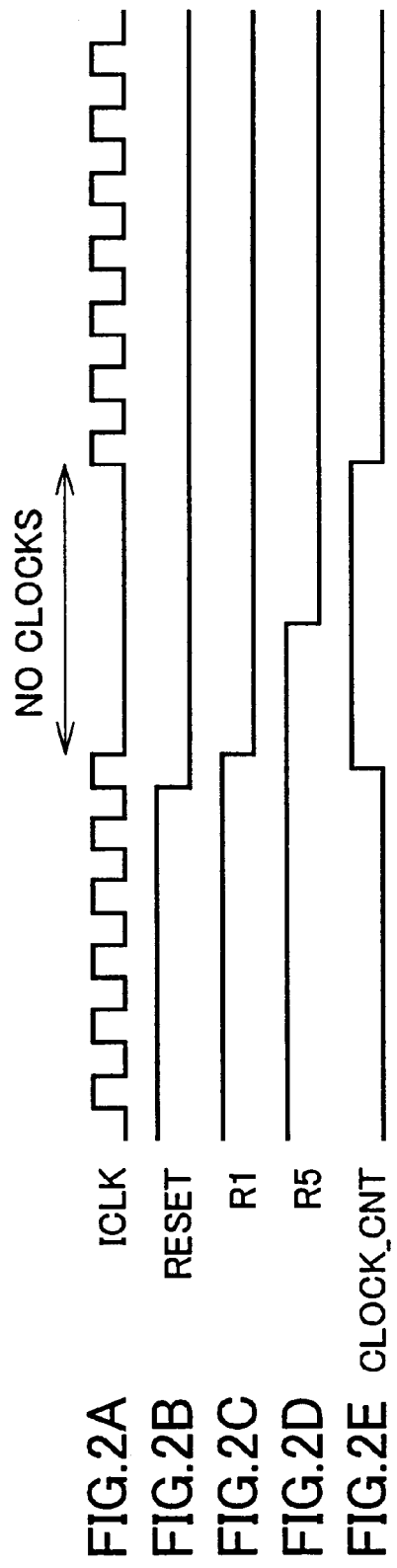
FIGS. 2A to 2E are timing charts of the clock control circuit shown in FIG. 1.

The clock signal is supplied to gate circuit 1. The clock signal is at the "L" level for the period in which the reset signal ("RESET") shown in FIG. 2B is at the "H" level. During the period, the internal clock signal is output as show in FIG. 2A. When the reset signal goes low ("L" level) and the clock control signal goes high ("H" level), the output of the gate circuit 1 goes low.

Figure 22:
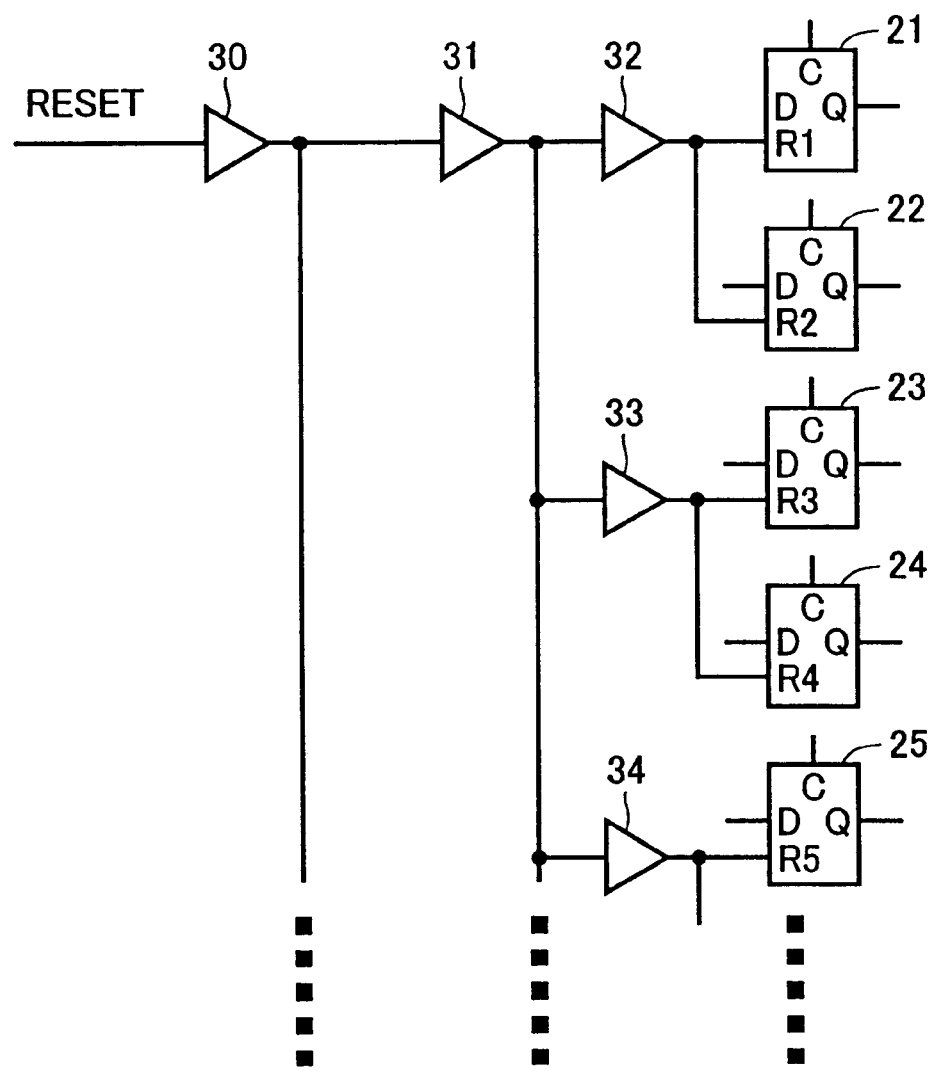
FIG. 22 is a circuit diagram showing a conventional clock control circuit in which a buffer circuit has a tree-structure.
Figure 24:
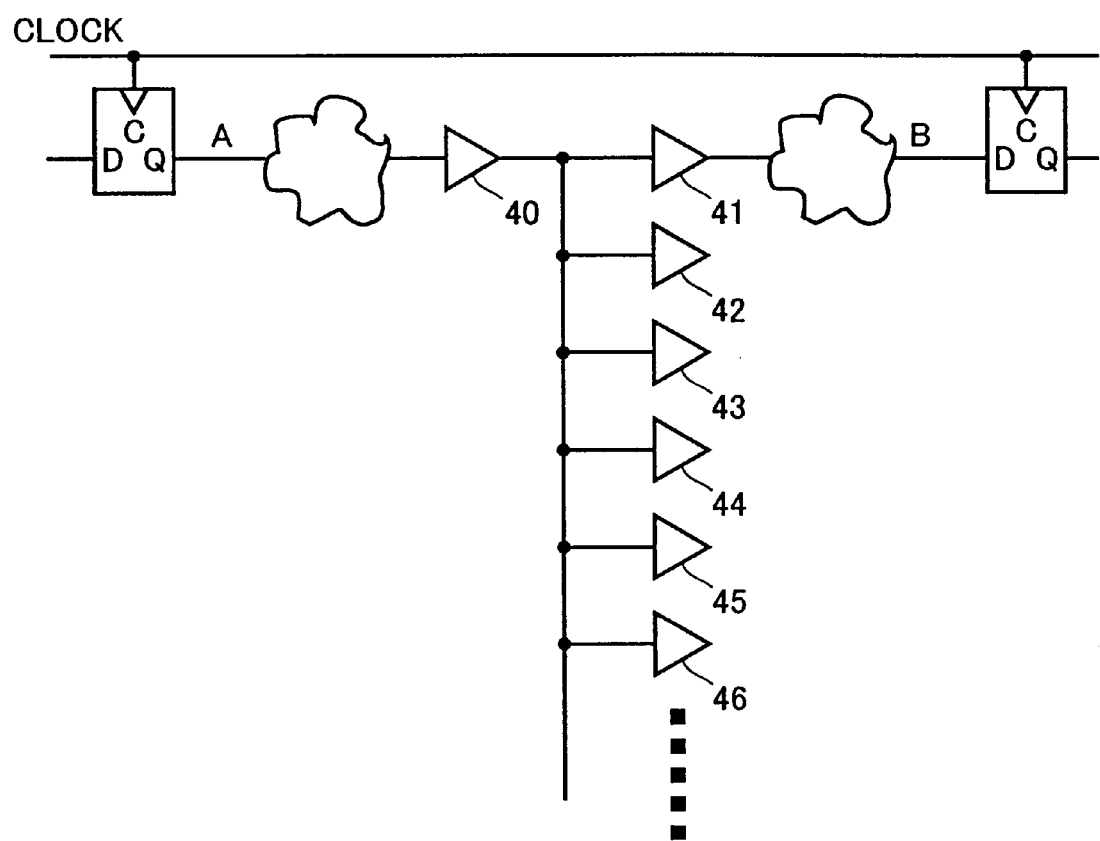
FIG. 24 is a circuit diagram of a clock control circuit having a path including a node having a large fan-out.

Therefore, even when a delay difference between reset signals R1 (FIG. 2C) and R5 (FIG. 2D) supplied to the internal circuit in response to the reset signal shown in FIG. 2B is longer than one cycle of the clock signal, after elapse of sufficient time since both of reset signals R1 and R5 propagate, the clock signal is re-supplied from the output of gate circuit 1. Consequently, an erroneous operation does not occur. As a result, the small circuit of low power consumption can be realized without the necessity of using the buffer of a large output as shown in FIG. 24 or the tree structure as shown in FIG. 22 for the node having a long delay time.

Figure 3:
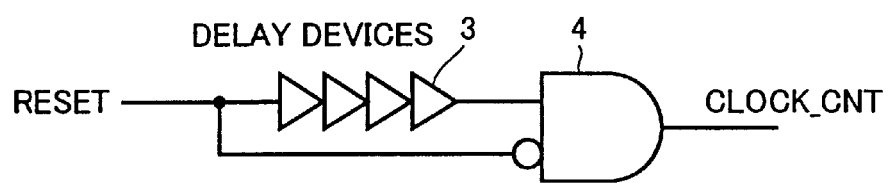
FIG. 3 is a diagram showing an example of a gate control circuit illustrated in FIG. 1.

A gate control circuit shown in FIG. 3 includes a delay device 3 for delaying the reset signal and an AND circuit 4 for receiving a logic inversion signal of the reset signal by one of its inputs, receiving an output signal of delay device 3 by the other input, and calculating the AND of the signals. Delay device 3 is constructed by connecting a plurality of buffer devices in series, and delay time is set so as to be equal to the period in which the supply of the clock signal is stopped.

The reset signal shown in FIG. 2B is delayed by delay device 3 and the delayed reset signal is input to AND circuit 4. From AND circuit 4, the clock control signal shown in FIG. 2E obtained by delaying the reset signal is output.

Figure 4:
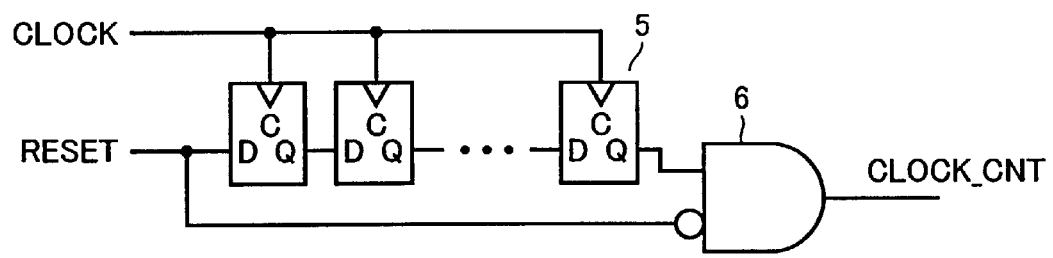
FIG. 4 is a diagram showing another example of the gate control circuit illustrated in FIG. 1.

In the example shown in FIG. 4, a delay circuit 5 is constructed by connecting a plurality of D-type flip flops in series. The reset signal is sequentially shifted on the basis of the clock signal, and the clock control signal obtained by delaying the reset signal by a predetermined time is supplied together with the set signal to an AND circuit 6, and means for counting the number of reset signals supplied is constructed. In this example as well, the count time in delay circuit 5 is set so as to be equal to the period in which the supply of the clock signal is stopped.

Second Embodiment

Figure 5:
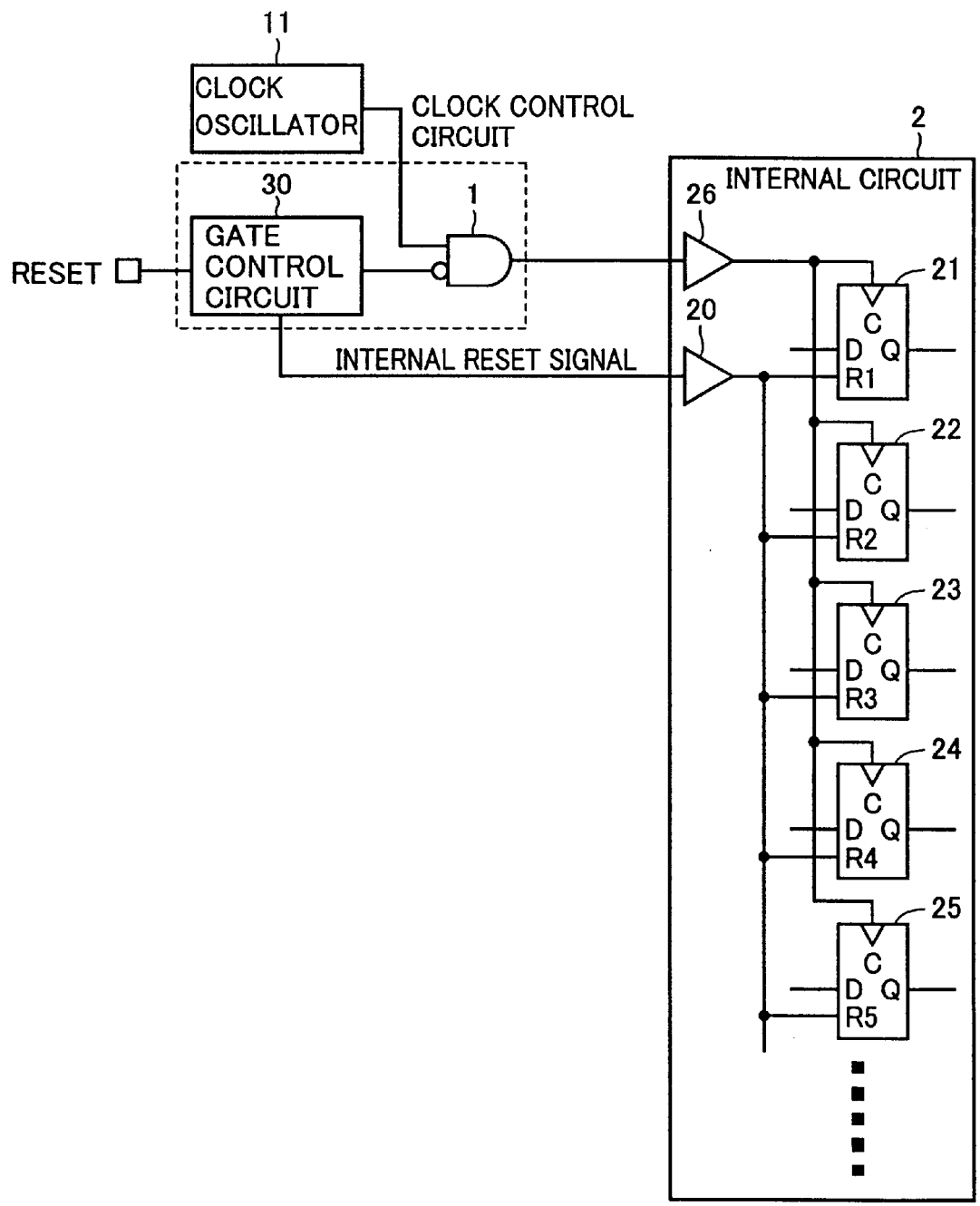
FIG. 5 is a block diagram showing a clock control circuit according to a second embodiment of the invention.

FIG. 5 is a block diagram showing a second embodiment of the invention. FIGS. 6A to 6G are timing charts for explaining the operation of the circuit of FIG. 5.

Figure 6:
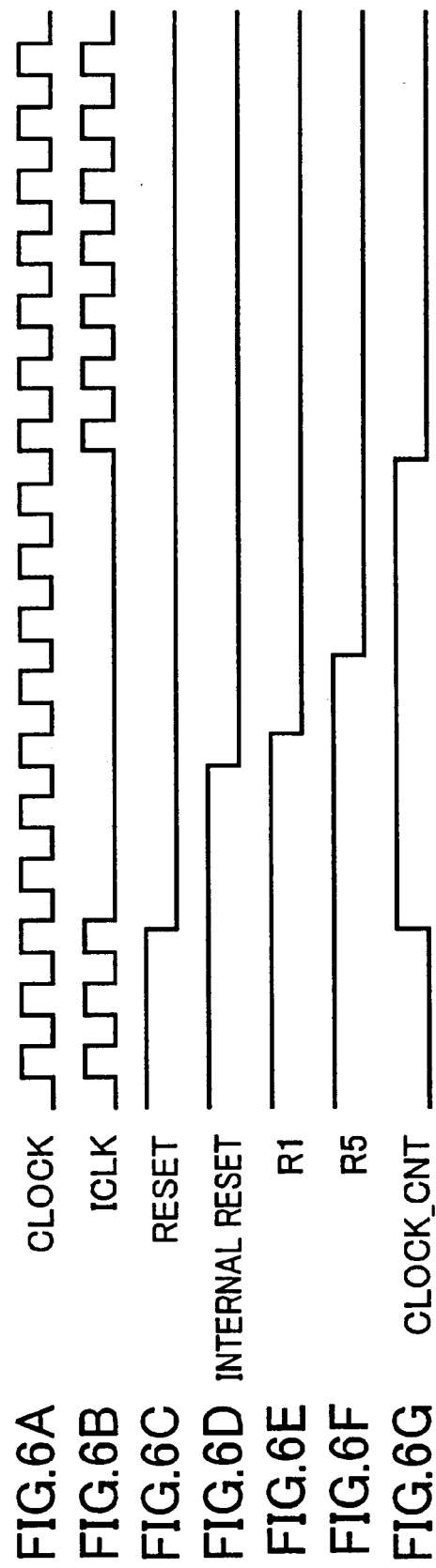
FIGS. 6A to 6G are timing charts for explaining the operation of the clock control circuit of FIG. 5.

In FIG. 5, the clock control circuit of the embodiment is constructed by gate circuit 1 having two input terminals and a gate control circuit 30. In a manner similar to FIG. 1, in response to the reset signal shown in FIG. 6C, gate control circuit 30 stops supply of the clock signal by gate circuit 1 as shown in FIG. 6B, generates an internal reset signal obtained by delaying a change of the level of the reset signal as shown in FIG. 6D, and stops the supply of the clock signal to internal circuit 2 for a time in which the logic level of the internal reset signal changes.

In internal circuit 2, in a manner similar to FIG. 1, the plurality of D-type flip flops 21 to 25 are provided. An internal reset signal output from clock control circuit 22 is commonly applied to reset terminals of D-type flip flops 21 to 25. The other configuration and operation are the same as those of FIG. 1. By providing gate control circuit 30, a safe circuit in which an erroneous operation does not easily occur can be constructed.

Figure 7:
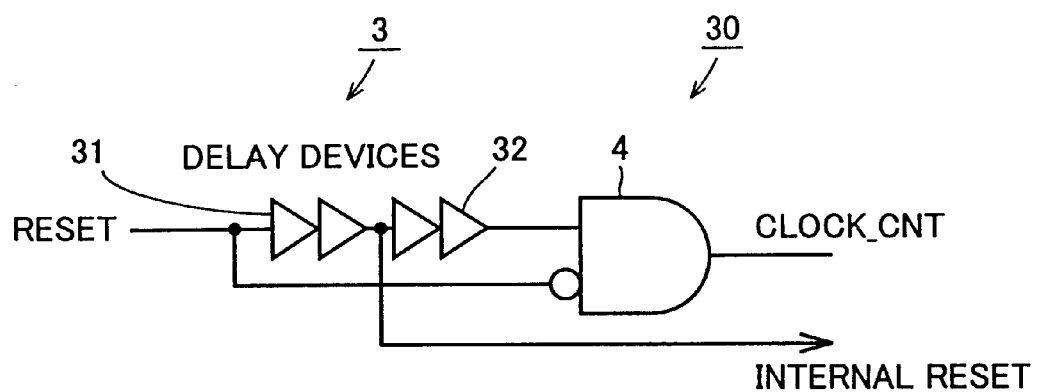
FIG. 7 is a diagram showing an example of a gate control circuit illustrated in FIG. 5.
Figure 8:
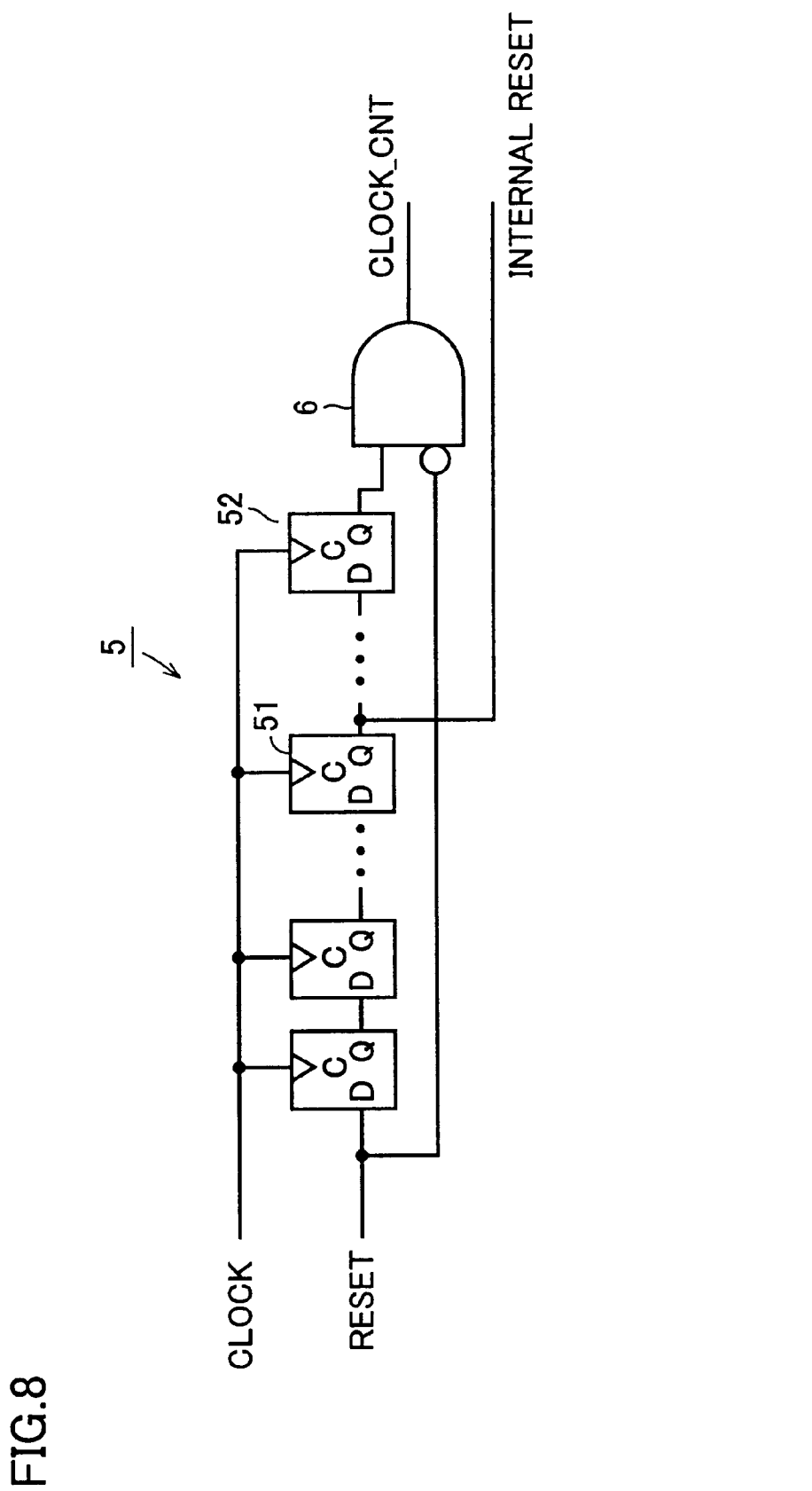
FIG. 8 is a diagram showing another example of the gate control circuit illustrated in FIG. 5.

FIGS. 7 and 8 show examples of the gate control circuit illustrated in FIG. 5. FIG. 7 shows a circuit, which is the same as that shown in FIG. 3, for outputting, as an internal reset signal, a signal output from a predetermined buffer device 31 other than buffer device 32 at the final stage in delay device 3 in which a plurality of buffer devices are connected in series. FIG. 8 shows a circuit, which is the same as that in FIG. 4, for outputting, as an internal reset signal, a signal output from a predetermined flip flop 51 other than a flip flop 52 at the final stage in delay circuit 5 constructed by a plurality of D-type flip flops. In both FIGS. 7 and 8, an internal reset signal having a delay amount corresponding to the half of the delay time of each of, for example, delay device 3 and delay circuit 5 from the reset signal is generated.

Third Embodiment

Figure 9:
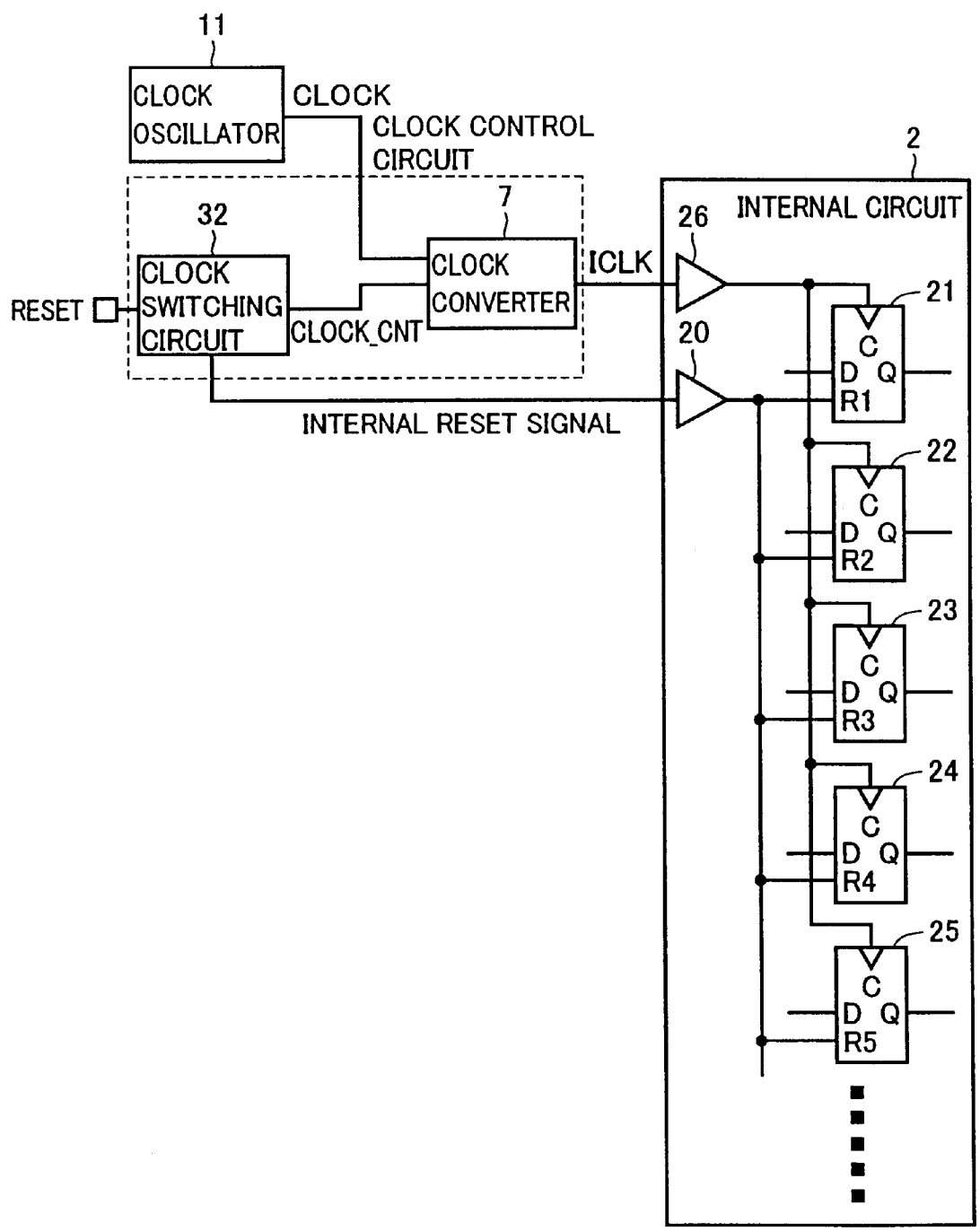
FIG. 9 is a block diagram showing a clock control circuit according to a third embodiment of the invention.

FIG. 9 is a block diagram showing a third embodiment of the invention. The clock control circuit of the embodiment is constructed by a clock converter 7 and a clock switching circuit 32. In place of gate circuit 1 and gate control circuit 12 shown in FIG. 1, clock converter 7 and clock switching circuit 32 are provided. Clock switching circuit 32 generates and outputs a control signal for decreasing the frequency of the internal clock signal to be supplied to internal circuit 2 by clock converter 7 for only a predetermined period in response to a reset signal, generates the internal reset signal obtained by delaying a change in level of the reset signal, and decreases the frequency of the clock signal to be supplied to internal circuit 2 for a time in which the logic level of the internal reset signal changes.

More concretely, clock switching circuit 32 can have the same configuration as that of the circuit of FIG. 7 or 8. Therefore, clock switching circuit 32 decreases the frequency of the clock signal in response to only to a change of the reset signal from the "H" level to the "L" level, and decreases the frequency of the clock signal only for the same period each time the circuit responds to the reset signal.

Clock converter 7 decreases the frequency of the clock signal for a predetermined period in accordance with the control signal. Internal circuit 2 has therein the plurality of D-type flip flops 21 to 25 in a manner similar to FIG. 1. A clock signal output from clock converter 7 is commonly supplied to clock terminals of D-type flip flops 21 to 25. The internal reset signal output from clock control circuit 22 is commonly supplied to reset terminals.

Internal circuit 2, clock converter 7, clock switching circuit 32, and clock oscillator 11 in FIG. 9 are integrated on the same semiconductor chip. It is also possible to provide no clock oscillator 11 on the chip and supply the clock signal from the outside.

Figure 10:
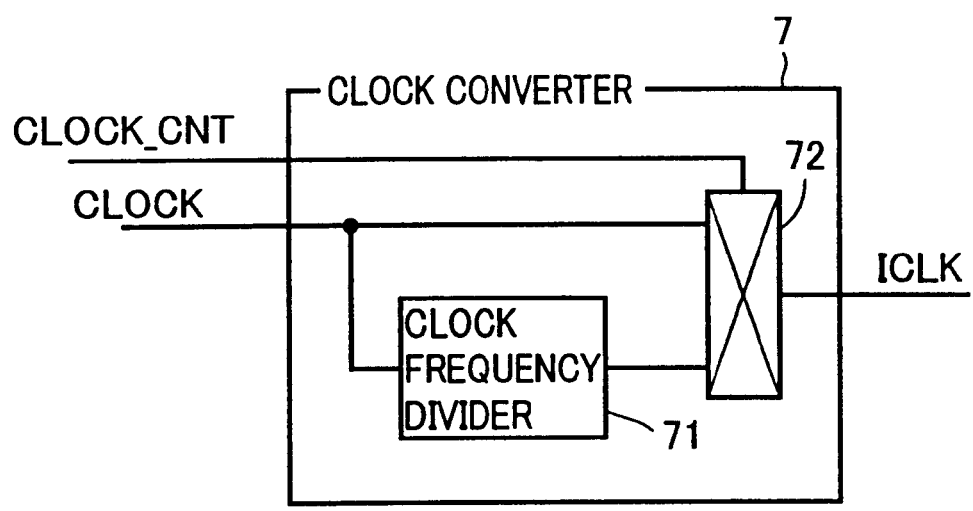
FIG. 10 is a circuit diagram showing a concrete example of a clock converter illustrated in FIG. 9.

FIG. 10 is a circuit diagram showing a concrete example of clock converter 7 illustrated in FIG. 9. In FIG. 10, clock converter 7 is constructed by a clock frequency divider 71 and a multiplexer 72. Clock frequency divider 71 takes the form of a counter for dividing the clock signal at a predetermined frequency dividing ratio and supplies the frequency divided signal to multiplexer 72. Multiplexer 72 switches the clock signal and the frequency divided signal on the basis of the clock control signal, and outputs the signal as the internal clock signal.

Clock converter 7 may employ, for example, a method of selecting a clock signal obtained by multiplying the clock signal or a method of controlling a frequency dividing ratio or a frequency multiplication ratio of a frequency divider or a frequency multiplier provided in clock converter 7.

Figure 11:
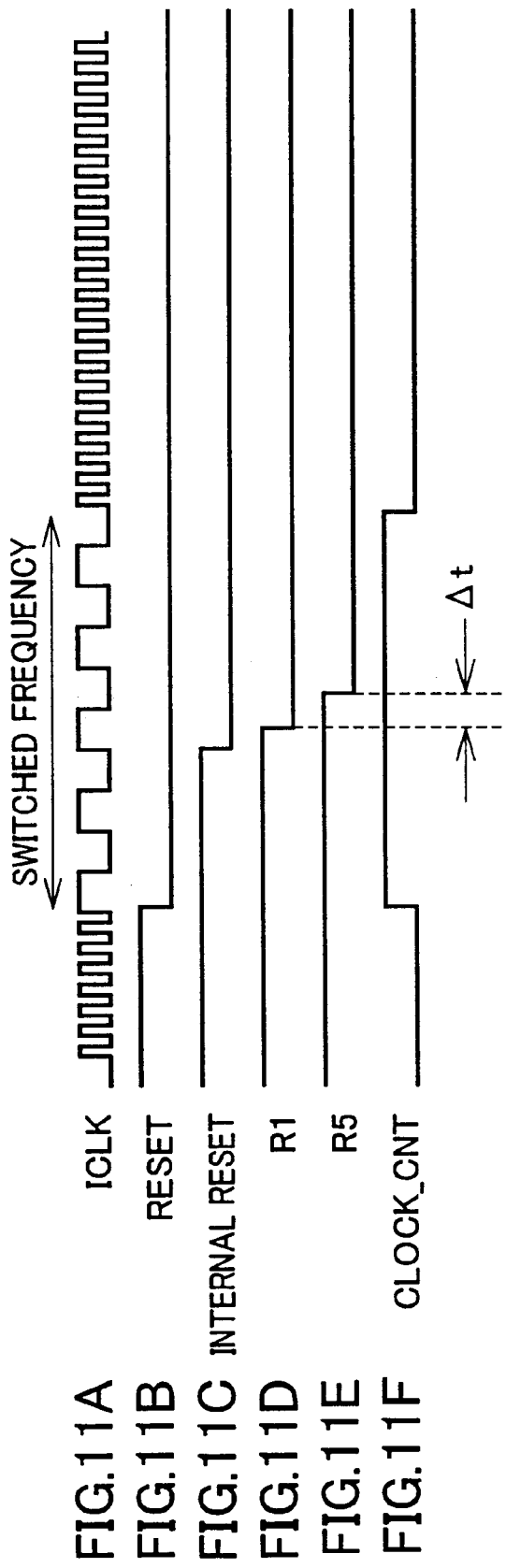
FIGS. 11A to 11F are timing charts for explaining the operation of the clock control circuit illustrated in FIG. 9.

FIGS. 11A to 11F are timing charts for explaining the operation of clock control circuit according to the third embodiment shown in FIG. 9. Multiplexer 72 shown in FIG. 10 outputs the clock signal as the internal clock signal as shown in FIG. 11A for the period in which the clock control signal shown in FIG. 11F is at the "L" level, and outputs the frequency divided signal as the internal clock signal for the period in which the clock control signal is at the "H" level. The frequency of the internal clock is set so that one clock cycle of the internal clock signal when the frequency is low becomes longer than delay time (At in FIG. 11) of the level change between signals R1 and R5.

In the embodiment, therefore, since the frequency of the internal clock signal is low during a few cycles in which the reset signal shown in FIG. 11B is at the "L" level, even if the delay in R1 to R5 is longer than one cycle of the clock signal, as long as the delay is within one cycle of the internal clock signal of the low frequency, an erroneous operation does not occur.

Figure 23:
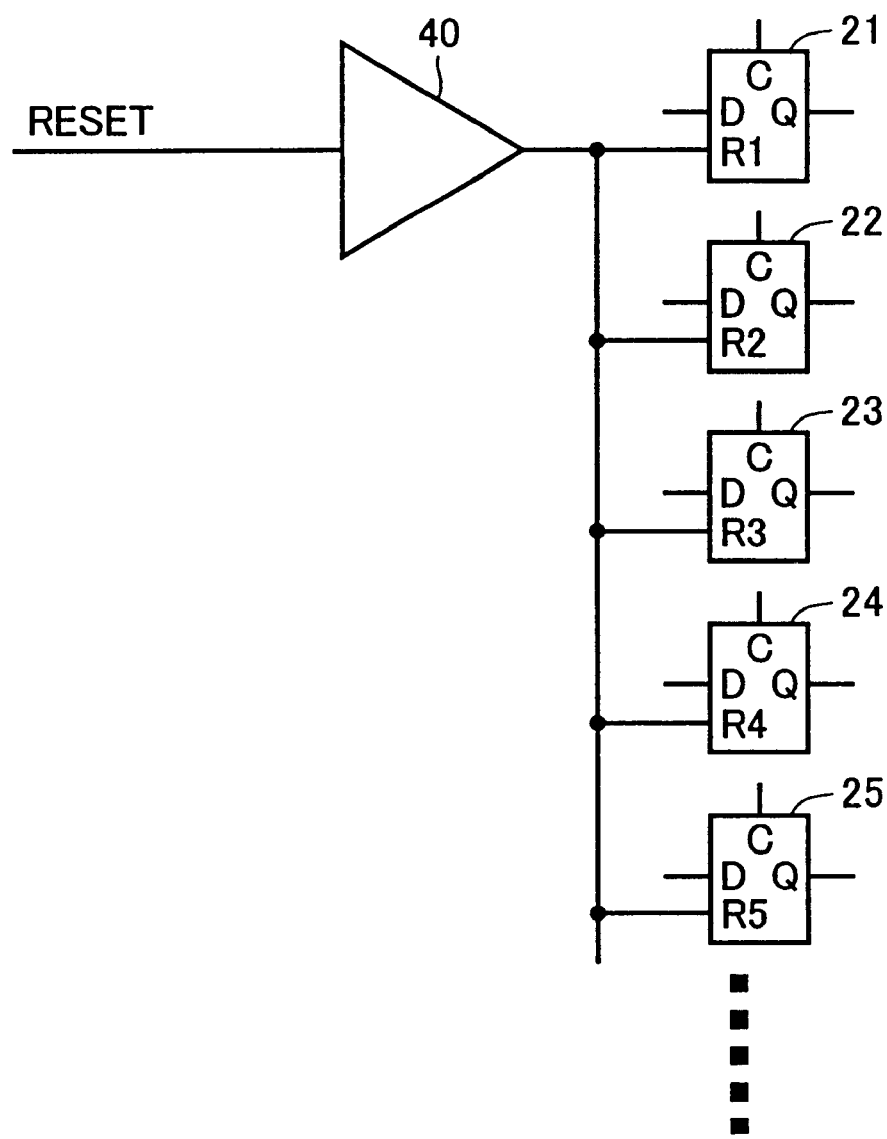
FIG. 23 is a circuit diagram of a conventional clock control circuit in which D-type flip flops are driven by a buffer circuit of a large output.

It is therefore unnecessary to use a buffer of a large output or to employ the tree structure for the node having long delay time as in FIGS. 22 and 23. Thus, the small circuit of low power consumption can be realized.

Fourth Embodiment

Figure 12:
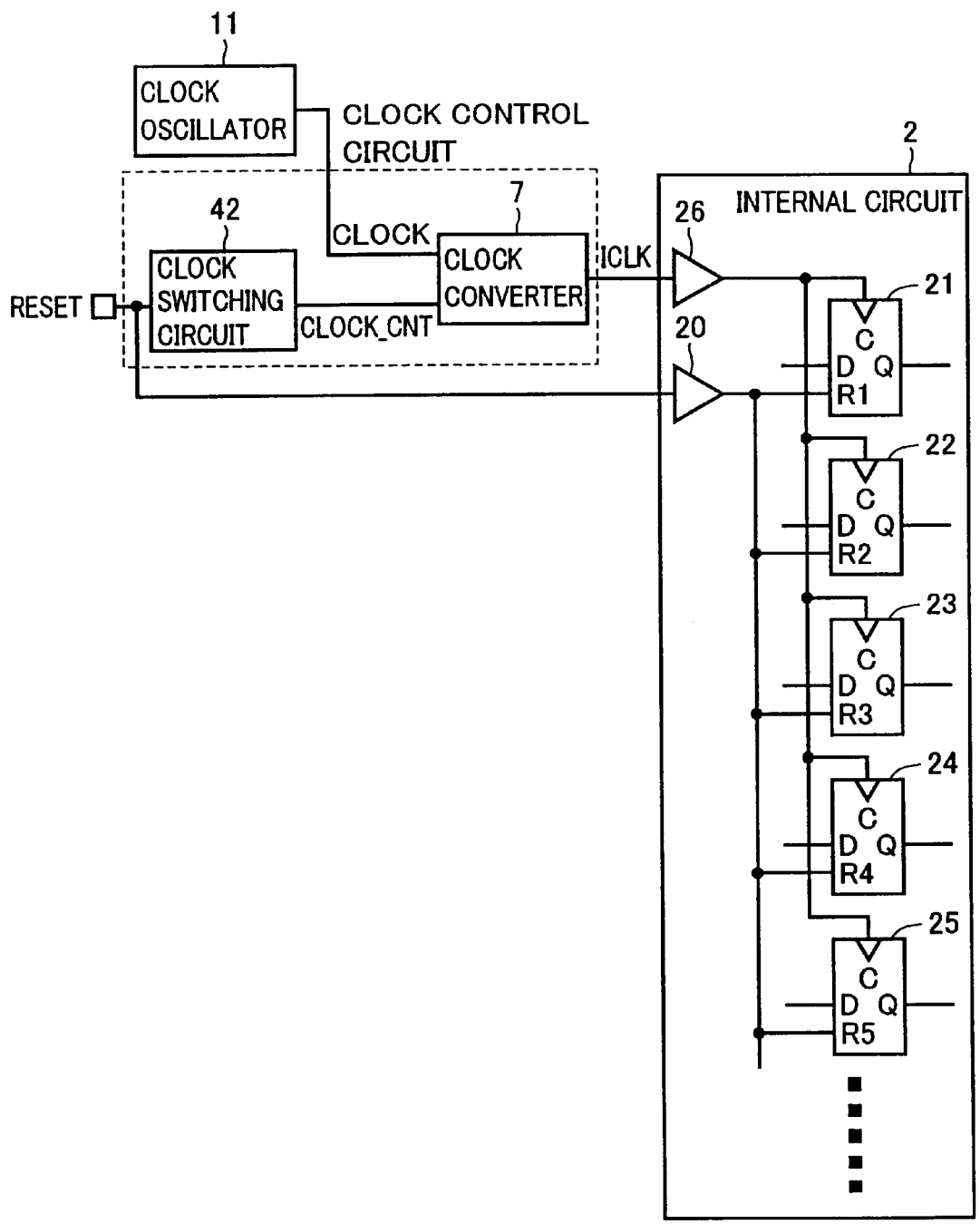
FIG. 12 is a block diagram showing a clock control circuit according to a fourth embodiment of the invention.

FIG. 12 is a block diagram showing a fourth embodiment of the invention. In FIG. 12, the clock control circuit is constructed by clock converter 7 and a clock switching circuit 42. Clock oscillator 11 and clock converter 7 have the same configurations as those in FIG. 9 and clock switching circuit 42 generates a control signal for decreasing the frequency of the clock signal to be supplied to internal circuit 2 and outputs the control signal to clock converter 7 in response to the reset signal. The reset signal is supplied to each of the reset terminals of the plurality of D-type flip flops 21 to 25 in internal circuit 2.

Clock switching circuit 42 has, concretely, the same configuration as that in FIG. 3 or 4. Therefore, immediately after the reset signal supplied to each of D-type flip flops 21 to 25 in internal circuit 2 changes from the "H" level to the "L" level, the frequency of the clock signal is lowered. In a manner similar to the example of FIG. 9, the lowered frequency is set so that one clock cycle of the clock signal becomes longer than the delay time of the level change between signals R1 and R5.

Fifth Embodiment

Figure 13:
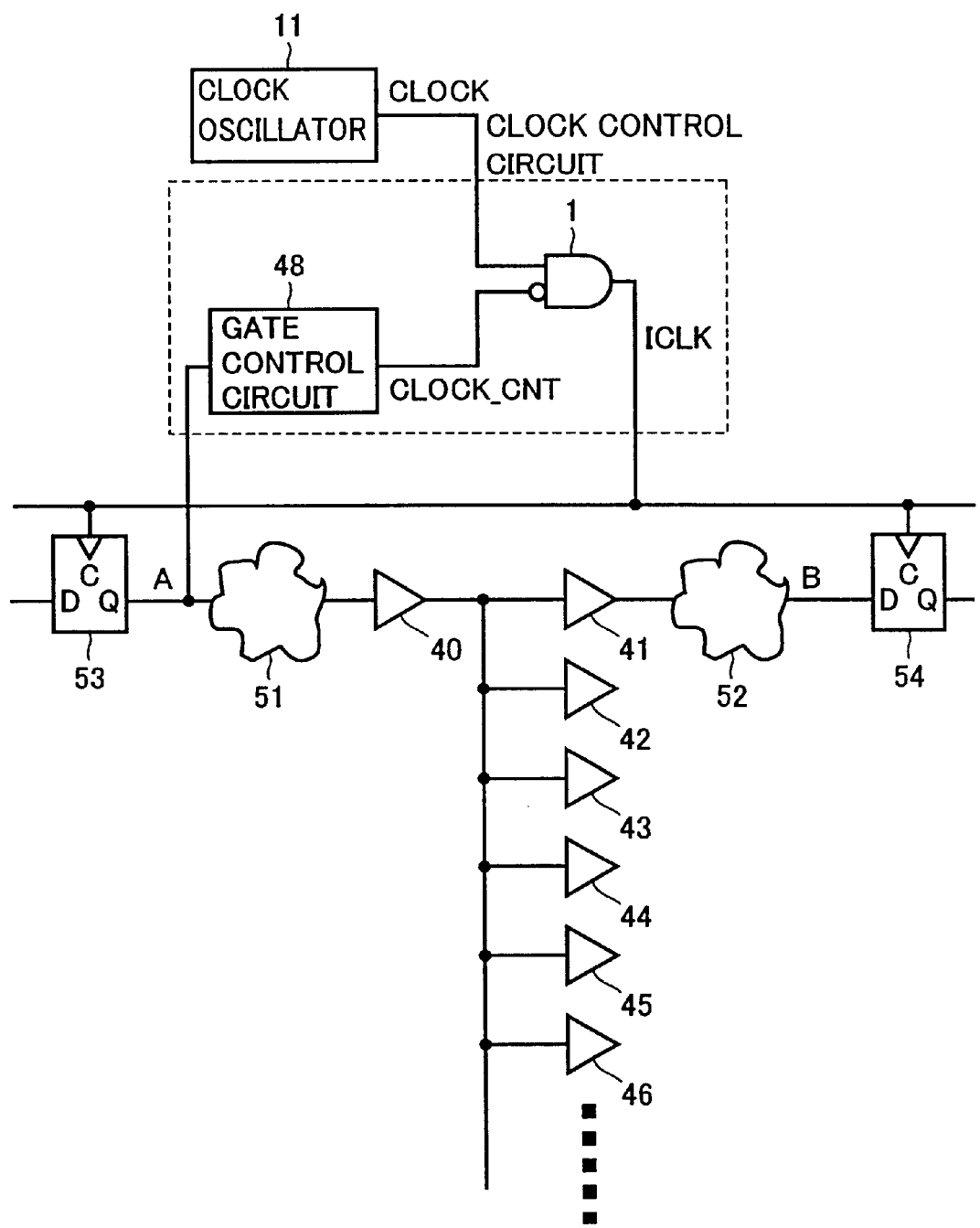
FIG. 13 is a block diagram showing a clock control circuit according to a fifth embodiment of the invention.

FIG. 13 is a block diagram showing a fifth embodiment of the invention. The embodiment is a modification of the conventional circuit of FIG. 24 and a clock control circuit is constructed by gate circuit 1 and a gate control circuit 48. Clock oscillator 11 and gate circuit 1 have the same configurations as those in FIG. 1, and an output signal of gate circuit 1 is supplied as an internal clock signal to the clock terminals of D-type flip flops 53 and 54. The circuits shown in FIG. 13 are formed on a single semiconductor chip.

In response to both a change from the "L" level to the "H" level and a change from the "H" level to the "L" level at the node A, gate control circuit 48 generates a control signal for stopping the supply of the internal clock signal for a predetermined period and outputs the control signal to gate circuit 1.

Each of D-type flip flops 53 and 54 stores data at the D terminal at the rising (or falling) edge of the clock signal. Logic circuit 51 taking the form of, for example, a combinational circuit performs a predetermined logic operation on data output from D-type flip flop 53 (signal at node A) and outputs resultant data to buffer 40. A logic circuit 52 performs a predetermined logic operation on data received from a buffer 41 and outputs resultant data to a D terminal (node B).

In the example, a circuit for always changing the level of a signal at node B in response to a change in level of a signal at node A is assumed. The level at node B does not always have to change like the change at node A. In the embodiment, inputs of a number of buffers 41 to 46 are commonly connected to the output of buffer 40. There is consequently an advantage that the fan-out is large.

Figure 14:
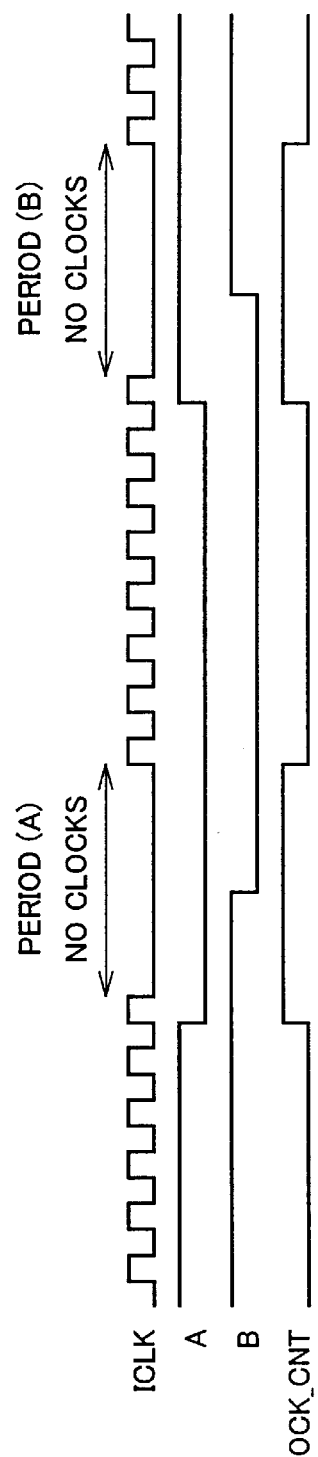
FIGS. 14A to 14D are timing charts of the embodiment shown in FIG. 13.

FIGS. 14A to 14D are timing charts of the embodiment shown in FIG. 13. When the control signal A passing through a node having long delay time changes from the "H" level to the "L" level as shown in FIG. 14B, by using the clock control circuit shown in FIG. 1, the control signal is asserted to instruct the stop of supply of the internal clock signal for a predetermined period (period A) as shown in FIG. 14A. Also in response to the change from the "L" level to the "H" level at the node A, the control signal is asserted to instruct the stop of supply of the clock signal for the predetermined period (period B).

In the embodiment, for each response to a change from the "H" level to the "L" level at the node A, the clock signal supply stop period (period A) is always the same. For each response to a change from the "L" level to the "H" level at the node A, the clock signal supply stop period (period A) is always the same. As a result, after elapse of sufficient time since a signal propagates through the path from A to B, the internal clock signal is re-supplied. Consequently, no erroneous operation occurs.

It is therefore unnecessary to use a buffer of a large output or employ the tree structure for the node having long delay time, so that the small circuit of low power consumption can be realized.

Figure 15:
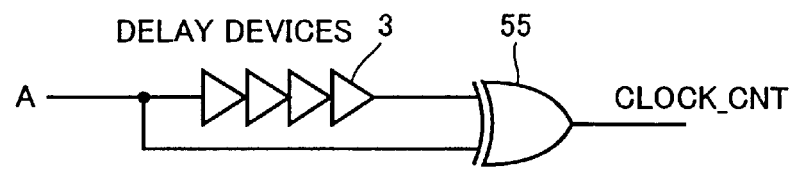
FIG. 15 is a diagram showing an example of a gate control circuit illustrated in FIG. 13.
Figure 16:
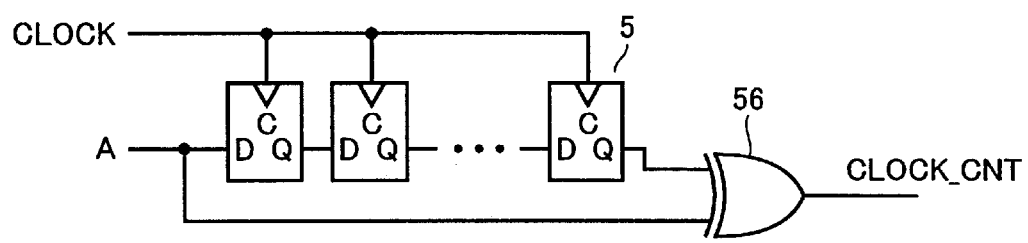
FIG. 16 is a diagram showing another example of the gate control circuit illustrated in FIG. 13.

Each of FIGS. 15 and 16 is a diagram showing an example of gate control circuit 48 in the clock control circuit illustrated in FIG. 13. Particularly, FIG. 15 shows a gate control circuit using a delay device, in which an exclusive OR (EXOR) gate 55 is used in place of gate circuit 4 illustrated in FIG. 3. FIG. 16 shows a gate control circuit using flip flops, in which an EXOR gate 56 is used in place of gate circuit 6 shown in FIG. 4. In the embodiment, each of the periods A and B almost coincides with delay time by the plurality of delay devices 3 in FIG. 16 and almost coincides with delay time by the plurality of flip flops 5 in FIG. 16.

Although FIG. 13 shows the example of stopping the supply of clock signals, it is also possible to use clock converter 7 shown in FIG. 10 in place of gate circuit 1 and decrease the frequency of the clock signal when the clock control signal is active as shown in the example of FIG. 12.

Although the clock control signal is made active at both the rising and falling edges of a signal at the node A in the example shown in FIG. 13, there can be also the case where a delay of the level change at node B in response to the rising (or falling) edge of the signal at node A is long, and a delay of the level change at node B in response to the falling (or rising) edge of the signal at node A is short to an extent that the delay is not critical. In this case, the clock control circuit may stop the clock signal or decrease the frequency for a predetermined time in response only to the rising (or falling) edge of a signal at node A. As the gate control circuit, the circuit of FIG. 3 or 4 may be employed.

Sixth Embodiment

Figure 17:
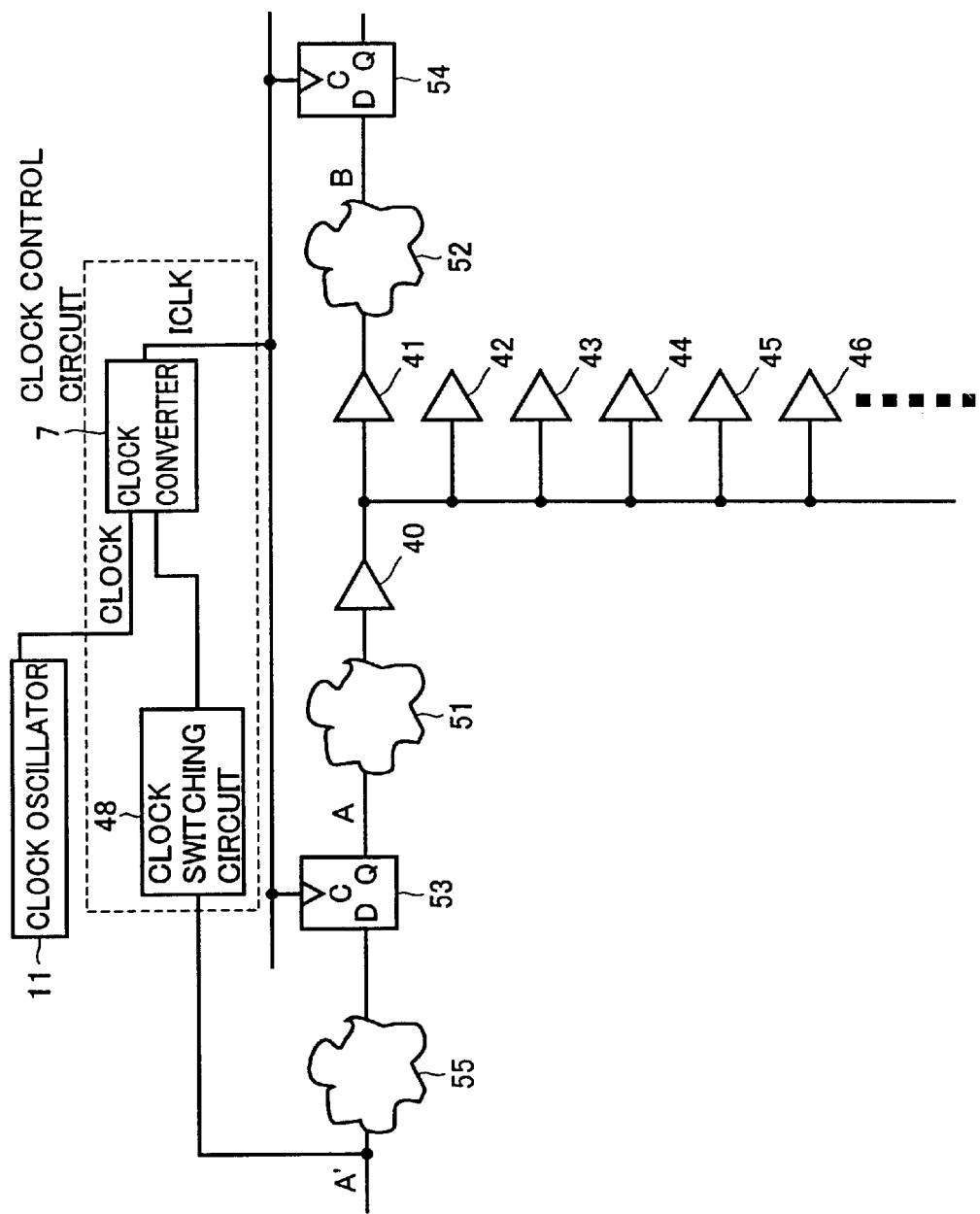
FIG. 17 is a block diagram showing a clock control circuit according to a sixth embodiment of the invention.

FIG. 17 is a block diagram showing a sixth embodiment of the invention. The embodiment is a modification of the circuit of FIG. 13. The clock control circuit is constructed by gate circuit 1 and gate control circuit 48. A signal at node A' is supplied to a logic circuit 55. Logic circuit 55 includes a sequential circuit capable of storing a signal in, for example, a signal propagation path, executes a predetermined logic operation, and outputs a result of the operation. Logic circuit 55 is also formed on the same chip together with the other circuits of FIG. 13. Logic circuit 55 is designed so that the level of a signal at node A always changes in response to a change in the logic level at node A'.

It is, however, unnecessary to change the level in the same manner at the nodes A' and A. D-type flip flop 53 is synchronized with the internal clock signal and, at node A connected to the output of logic circuit 55, a signal of which level changed after a predetermined period since the logic level changes at node A' appears.

Gate control circuit 48 can employ the same configuration as that of FIG. 13 but receives a signal at node A', not node A. The other configuration is the same as that of FIG. 13.

Figure 18:
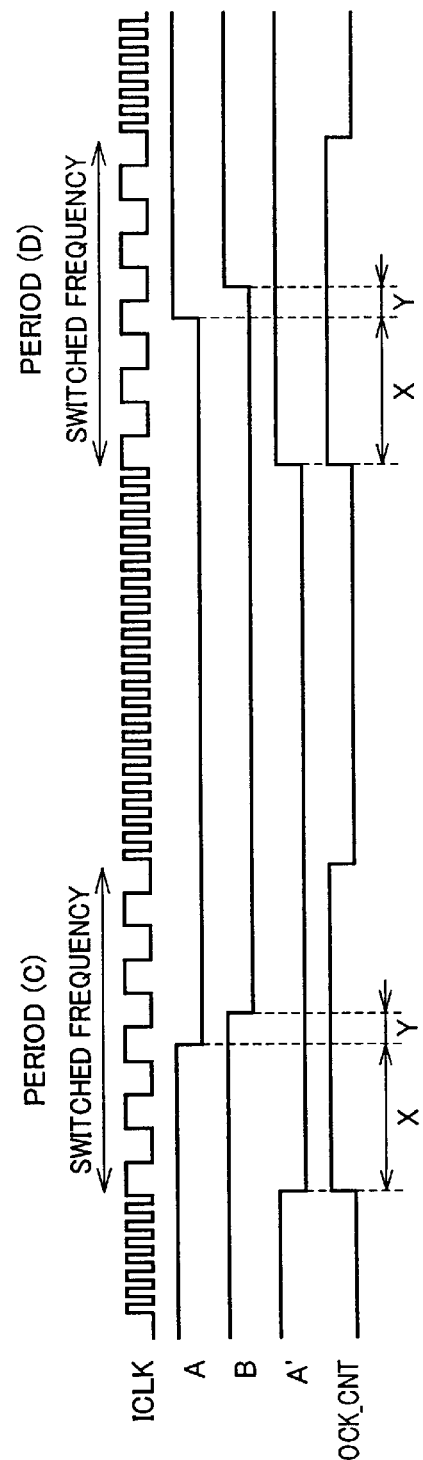
FIGS. 18A to 18E are timing charts of the embodiment shown in FIG. 17.

FIGS. 18A to 18E are timing charts of the embodiment shown in FIG. 17. By using the clock control circuit shown in FIG. 1, when a signal at node A' having long delay time changes from the "H" level to the "L" level as shown in FIG. 18D, the control signal is asserted to instruct the decrease in frequency of the clock signal for a predetermined period (period C) as shown in FIG. 18A, and also in response to the change from the "L" level to the "H" level of a signal at node A', the control signal is asserted to instruct the decrease in frequency of the clock signal for a predetermined period (period D).

In the embodiment, at the time of the response to the change from the "H" level to the "L" level at node A as shown in FIG. 18B, the clock signal frequency decreased period (period D) is always the same.

In response to a change in level at node A', the logic level changes at node A with a delay only by the period X via logic circuit 55 and flip flop 53. In response to the level change at node A, the logic level changes with a delay only by the period Y at node B shown in FIG. 18C via logic circuit 51, drivers 40 and 41, and logic circuit 52. The periods C and D, that is, delay time by either delay device 3 in FIG. 15 or flip flop 5 in FIG. 16 are set so that the frequency of the clock signal always is low around the change in the logic level at each of nodes A and B.

In the embodiment, in place of decreasing the frequency of the clock signal, the supply of the clock signal may be stopped as shown in FIG. 1. Depending on the situation, the frequency of the clock signal may be decreased or the supply of the clock signal may be stopped for a predetermined period in response to only to the rising edge or the falling edge of the signal at node A'.

Seventh Embodiment

Figure 19:
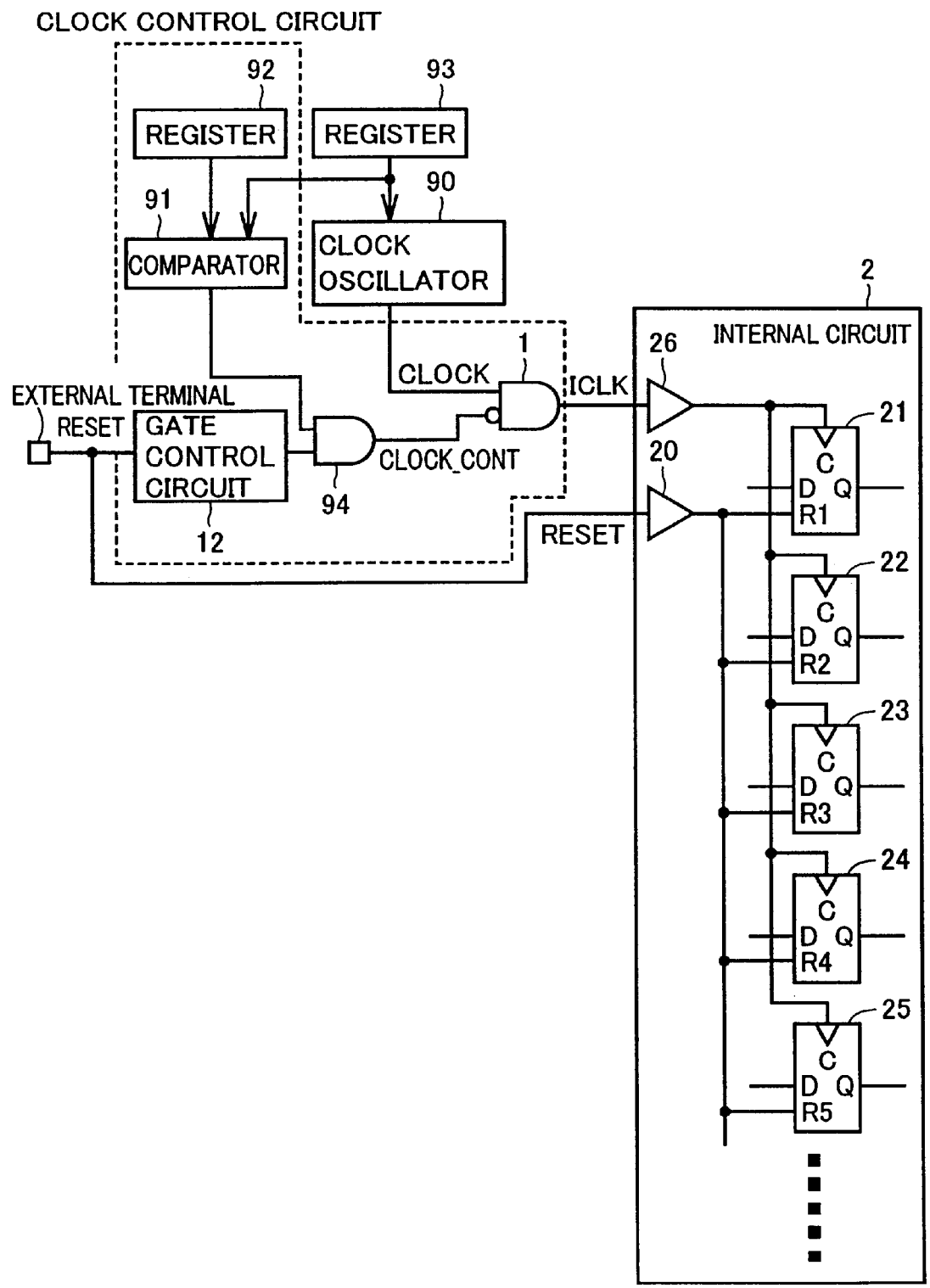
FIG. 19 is a block diagram showing a clock control circuit according to a seventh embodiment of the invention.

FIG. 19 is a block diagram showing a seventh embodiment of the invention. A clock control circuit of the embodiment is constructed by a gate circuit 1, an AND gate circuit 94, a gate control circuit 12, a register 92, and a comparator 91. A mechanism for stopping the supply of clock signals only when the frequency of the clock signal is equal to or higher than a predetermined frequency is added. Only the configuration different from that of FIG. 1 will be described. The case of using an oscillator capable of making the frequency of the clock signal to be output as a clock oscillator 90 will be described here. Clock oscillator 90 outputs a clock signal which oscillates at a frequency designated in a register 93. Register 93 holds a value for setting a frequency at which internal circuit 2 operates.

On the other hand, register 92 holds a value for designating a predetermined frequency. In each of registers 92 and 93, a value is set from a CPU in the chip (or an external CPU).

Comparator 91 compares the value in register 92 with the value in register 93 and determines whether or not a frequency designated in register 92 is equal to or higher than a frequency designated in register 93. When the frequency designated in register 92 is equal to or higher than that designated in register 93, comparator 91 outputs the "H" level. If not, comparator 91 outputs the "L" level. Register 92 and comparator 91 construct a determination circuit for determining whether the frequency of a clock signal is equal to or higher than a predetermined frequency. Gate control circuit 12 is the same as that shown in FIG. 1. AND gate 94 calculates the AND logic between the output of gate control circuit 12 and the output of comparator 91 and outputs a result of the operation as a clock control signal to one of inputs of gate circuit 1.

Therefore, even if gate control circuit 12 outputs the "H" level, when comparator 91 outputs the "L" level, that is, when the frequency of the clock signal output from clock oscillator 90 is lower than the frequency designated in register 92, the clock control signal becomes at the "L" level, and the clock signal output from clock oscillator 90 is output as it is as the internal clock signal. On the other hand, when comparator 91 outputs the "H" level, that is, when the frequency of the clock signal output from clock oscillator 90 is equal to or higher than the frequency designated in register 92, an output of gate control circuit 12 becomes the clock control signal to stop the supply of the clock signal in a manner similar to FIG. 1.

When the clock signal is not generated by clock oscillator 90 as shown in FIG. 19 but is supplied from the outside of the chip, it is possible to eliminate registers 92 and 93 and comparator 91 and, instead, provide a determination circuit for receiving a clock signal from the outside and determining whether the frequency of the clock signal is equal to or higher than a predetermined frequency, and supply an output of the determination circuit to one of the inputs of AND gate 94.

As any of the circuits shown in FIGS. 5, 9, 12, 13, and 17, by employing the circuit of FIG. 19, only when the clock signal has a frequency equal to or higher than a predetermined frequency, the clock signal can be stopped or the frequency of the clocks signal can be lowered.

Although the case where the circuit for supplying the clock signal which stops the clock signal or decreases the frequency of the clock signal has been described above, the invention is not limited to the case. In a system that an integrated circuit on which a chip on which the clock control circuit of the invention is formed and integrated circuits formed on a plurality of semiconductor chips are mounted on a mother board, a clock signal for stopping a clock control circuit or lowering the frequency may be supplied to all or a par of the integrated circuits formed on the chips different from the chip on which the clock control circuit is formed.

It is also possible to supply stopped or frequency-reduced clock signal ICLK to all the blocks constructing internal circuit 2, or only to a part of the blocks. In the latter case, the blocks not supplied with clock signal ICLK are supplied with, for example, clock signal CLOCK output from clock oscillator 11. Further, clock signal ICLK may be supplied to all or a part of the blocks constructing internal circuit 2, while a clock signal supplied to an integrated circuit outside the chip is kept unchanged. In such a case, clock signal CLOCK output from clock oscillator 11 may be output to the outside the chip.

As described above, according to the embodiments of the invention, a clock signal is re-supplied from the output of the gate circuit after elapse of sufficient time since a first signal has propagated, so that an erroneous operation does not occur. As a result, it is unnecessary to use a buffer of a large output or employ the tree structure for a node having long delay time. The circuit which operates with reliability can be constructed, and the small circuit of low power consumption can be realized.

The embodiments disclosed here are to be considered in all respects as illustrative and not restrictive. The scope of the invention is indicated by the appended claims rather than by the foregoing description and all changes which come within the meaning and range of equivalency of the claims are therefore intended to be embraced therein.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A clock control circuit comprising:
   a gate circuit for stopping supply of a clock signal; and
   a gate control circuit for stopping supply of said clock signal by said gate circuit in response to a first signal and stopping the supply of said clock signal always only for a predetermined period when said first signal changes from a first state to a second state.

2. The clock control circuit according to claim 1, wherein said gate control circuit performs arithmetic operation by using said first signal and a delay signal obtained by delaying the first signal and outputs a second signal for providing an instruction to stop supply of said clock signal to said gate circuit.

3. The clock control circuit according to claim 1, wherein said gate control circuit performs arithmetic operation by using said first signal and a count signal obtained by counting the first signal, and outputs a second signal for providing an instruction to stop supply of said clock signal to said gate circuit.

4. The clock control circuit according to claim 1, wherein said gate control circuit generates a second signal of which logic level changes in response to said first signal and stops the supply of said clock signal for a period in which the logic level of said second signal changes.

5. The clock control circuit according to claim 1, wherein said first signal is a reset signal resetting memory content of a memory device.

6. The clock control circuit according to claim 4, wherein said gate control circuit uses a signal obtained by delaying said first signal as said second signal, performs an arithmetic operation by using said first signal and a delay signal obtained by delaying said second signal, and outputs a third signal for providing an instruction to stop the supply of said clock signal to said gate circuit.

7. The clock control circuit according to claim 4, wherein said gate control circuit uses a signal obtained by counting said first signal as said second signal, performs an arithmetic operation by using said first signal and a count signal obtained by counting said second signal, and outputs a third signal for providing an instruction to stop the supply of said clock signal to said gate circuit.

8. A clock control circuit comprising:

a gate circuit for stopping supply of a clock signal; and a gate control circuit for stopping supply of said clock signal by said gate circuit in response to a first signal, generating a second signal of which logic level changes in response to said first signal, and stopping the supply of said clock signal for a period in which the logic level of said second signal changes.

9. The clock control circuit according to claim 8, further comprising a determination circuit for determining whether or not a frequency of said clock signal is equal to or higher than a predetermined frequency, wherein when it is determined that the frequency of said clock signal is equal to or higher than the predetermined frequency, said gate control circuit stops supply of said clock signal.

10. The clock control circuit according to claim 8, wherein said second signal is a reset signal resetting memory content of a memory device.

11. A clock control circuit comprising:

a clock converting circuit for changing a frequency of a clock signal; and a clock switching circuit for decreasing the frequency of said clock signal by said clock converting circuit in response to a first signal and decreasing the frequency of said clock signal always only for a predetermined period when said first signal changes from a first state to a second state.

12. The clock control circuit according to claim 11, wherein said clock switching circuit performs arithmetic operation by using said first signal and a delay signal obtained by delaying the first signal and outputs a second signal for providing an instruction to change the frequency of said clock signal.

13. The clock control circuit according to claim 11, wherein said clock switching circuit performs arithmetic operation by using said first signal and a count signal obtained by counting the first signal, and outputs a second signal for providing an instruction to change the frequency of said clock signal to said clock converting circuit.

14. The clock control circuit according to claim 11, wherein said clock switching circuit generates a second signal of which logic level changes in response to said first signal and decreases the frequency of said clock signal for a period in which the logic level of said second signal changes.

15. The clock control circuit according to claim 11, wherein said clock switching circuit uses a signal obtained by counting said first signal as a second signal, performs an arithmetic operation by using said first signal and a count signal obtained by further counting said second signal, and outputs a third signal for providing an instruction to stop the supply of said clock signal to said clock converting circuit.

16. The clock control circuit according to claim 14, wherein said clock switching circuit uses a signal obtained by delaying said first signal as said second signal, performs an arithmetic operation by using said first signal and a delay signal obtained by delaying said second signal, and outputs a third signal for providing an instruction to stop the supply of said clock signal to said clock converting circuit.

17. The clock control circuit according to claim 14, wherein said clock switching circuit uses a signal obtained by counting said first signal as said second signal, performs an arithmetic operation by using said first signal and a count signal obtained by counting said second signal, and outputs a third signal for providing an instruction to stop the supply of said clock signal to said clock converting circuit.

18. A clock control circuit comprising:

a clock converting circuit for changing a frequency of a clock signal; and a clock switching circuit for outputting a clock signal of which frequency is decreased by said clock converting circuit from said clock converting circuit in response to a first signal, generating a second signal of which logic level changes in response to said first signal, and decreasing the frequency of said clock signal for a period in which the logic level of said second signal changes.

19. The clock control circuit according to claim 18, further comprising a determination circuit for determining whether or not the frequency of said clock signal is equal to or higher than a predetermined frequency, wherein when it is determined that the frequency of said clock signal is equal to or higher than the predetermined frequency, said clock switching circuit decreases the frequency of said clock signal.

20. The clock control circuit according to claim 18, wherein said second signal is a reset signal resetting memory content of a memory device.

* * * * *